US012357527B1

(12) United States Patent
Xiao et al.

(10) Patent No.: US 12,357,527 B1
(45) Date of Patent: Jul. 15, 2025

(54) MULTIFUNCTIONAL MUSCLE RELAXER

(71) Applicant: Jianzhong Zhou, Wuhan (CN)

(72) Inventors: Lan Xiao, Hubei (CN); Jianzhong Zhou, Wuhan (CN)

( * ) Notice: Subject to any disclaimer, the term of this patent is extended or adjusted under 35 U.S.C. 154(b) by 0 days.

(21) Appl. No.: 18/895,547

(22) Filed: Sep. 25, 2024

(51) Int. Cl.

| | |
|---|---|
| ***A61H 15/00*** | (2006.01) |
| ***A63B 21/00*** | (2006.01) |
| ***A63B 23/16*** | (2006.01) |

(52) U.S. Cl.
CPC ..... *A61H 15/0092* (2013.01); *A63B 21/4023* (2015.10); *A63B 21/4035* (2015.10); *A63B 23/16* (2013.01); *A61H 2015/0035* (2013.01); *A61H 2201/0153* (2013.01); *A61H 2201/1261* (2013.01)

(58) Field of Classification Search
CPC ............ A61H 15/0092; A61H 15/0085; A61H 15/00; A61H 2015/0014; A61H 2015/0021; A61H 2015/005; A61H 2015/0035; A61H 2015/0028; A61H 7/003; A61H 2205/06; A61H 2205/10; A61H 2205/106; A61H 2205/108; A61H 2201/0192; A61H 2201/1635; A61H 2201/1638; A61H 2201/1253; A61H 2201/0153; A61H 2201/1261; A61H 2201/0161; A63B 21/4023; A63B 21/4035; A63B 23/16
See application file for complete search history.

(56) References Cited

U.S. PATENT DOCUMENTS

| | | | | |
|---|---|---|---|---|
| 5,792,081 A * | 8/1998 | Cross | A61H 15/0092 601/129 |
| 2013/0289454 A1* | 10/2013 | Wang | A61H 15/00 601/132 |
| 2014/0228722 A1* | 8/2014 | Nelson | A61H 15/0092 601/125 |
| 2016/0296415 A1* | 10/2016 | Cross | A61H 15/0092 |
| 2018/0280229 A1* | 10/2018 | Cross | A61H 7/003 |
| 2019/0099323 A1* | 4/2019 | Nelson | A61H 15/0092 |
| 2019/0274915 A1* | 9/2019 | Cross | A61H 15/0092 |

* cited by examiner

*Primary Examiner* — Joseph D. Boecker
*Assistant Examiner* — Brian T Khong
(74) *Attorney, Agent, or Firm* — Hawaii Patent Services; Nathaniel K. Fedde; Kenton N. Fedde

(57) ABSTRACT

A multifunctional muscle relaxer comprises a grip body and a massage member; the grip body is provided with an installation groove for installing the massage member, a pin shaft component is arranged between the massage member and the installation groove, and the massage member is detachably connected with the grip body through the pin shaft component; the pin shaft component is connected with the installation groove in a sliding manner and has a rotatable position and a fixed position; a first grip part is arranged on the grip body, and a grip strength exercise device is arranged in the first grip part.

17 Claims, 8 Drawing Sheets

MULTIFUNCTIONAL MUSCLE RELAXER

TECHNICAL FIELD

The present disclosure relates to the technical field of body massage devices, in particular to a muscle relaxation device.

BACKGROUND

At present, with the acceleration of the pace of modern life, it is increasingly common for people to maintain bad posture, lack of exercise or excessive exercise for a long time, which leads to frequent problems such as muscle fatigue, soreness, stiffness and even injury. With this background, the market demand for equipment that can effectively relieve muscle tension and promote muscle relaxation and recovery is increasing. At the same time, with the rapid development of materials science, ergonomics and other multidisciplinary technologies, it provides strong technical support for the research and development of multifunctional muscle relaxers.

For example, the U.S. Patent No. 20200246214 has disclosed an "Adjustably Tensioned Roller Massage System". The roller massage system provides a pair of roller massage components with opposite adjustable tension or spacing relationship to allow each of the pair of roller massage components to be engaged on the corresponding massageable part of the body.

In addition, the U.S. Patent No. 20040254508 discloses a "Massage bar", which includes a plurality of rows of longitudinal massage protrusions at equal intervals on its outer surface. Each protrusion is 0.5 cm to 2.0 cm high, and the distance between every two adjacent protrusions is greater than the height of the protrusions. When the massage stick is placed and rolled on a certain part of the human body, rows of massage protrusions can only alternately hit and press the body, just like the muscles of the pressed body jumping up and down for a point massage.

The massager in the above patent has a simple and integrated structure, is not suitable for users with different bodies, is inconvenient to disassemble, store and maintain, and has no hand exercise function.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present disclosure provides a multifunctional muscle relaxer to solve the problems that the existing relaxer is inconvenient to disassemble, store and maintain, and the massager has no hand exercise function.

In order to achieve the above purpose, the present disclosure adopts the following technical solution:

the present disclosure provides a multifunctional muscle relaxer, which includes a grip body and a massage member; the grip body is provided with an installation groove for installing the massage member, a pin shaft component is arranged between the massage member and the installation groove, and the massage member is detachably connected with the grip body through the pin shaft component; the pin shaft component is connected with the installation groove in a sliding manner and has a rotatable position and a fixed position; a first grip part is arranged on the grip body, and a grip strength exercise device is arranged in the grip part.

The present disclosure also provides a multifunctional muscle relaxer, which includes a grip body, a first massage part and a second massage part; the grip body is provided with an installation groove for installing a massage member, a pin shaft component is arranged between the massage member and the installation groove; the first massage part and the second massage part are both detachably connected with the grip body through the pin shaft component; the pin shaft component is connected with the installation groove in a sliding manner and has a rotatable position and a fixed position; the grip body is provided with a first grip part, and a grip strength exercise device is arranged in the first grip part.

The present disclosure also provides a multifunctional muscle relaxer, which includes a grip body and a massage member; the grip body is provided with an installation groove for installing a massage member, a pin shaft component is arranged between the massage member and the installation groove, and the massage member is detachably connected with the grip body through the pin shaft component; the pin shaft component is connected with the installation groove in a sliding manner and has a rotatable position and a fixed position; the pin shaft component comprises a rotating member, a muff-coupling member and a limit member; the rotating member and the muff-coupling member are respectively arranged at notches at two sides of the installation groove; a limit structure is arranged between the rotating member and the muff-coupling member.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

REFERENCE SIGNS

Figure 1:
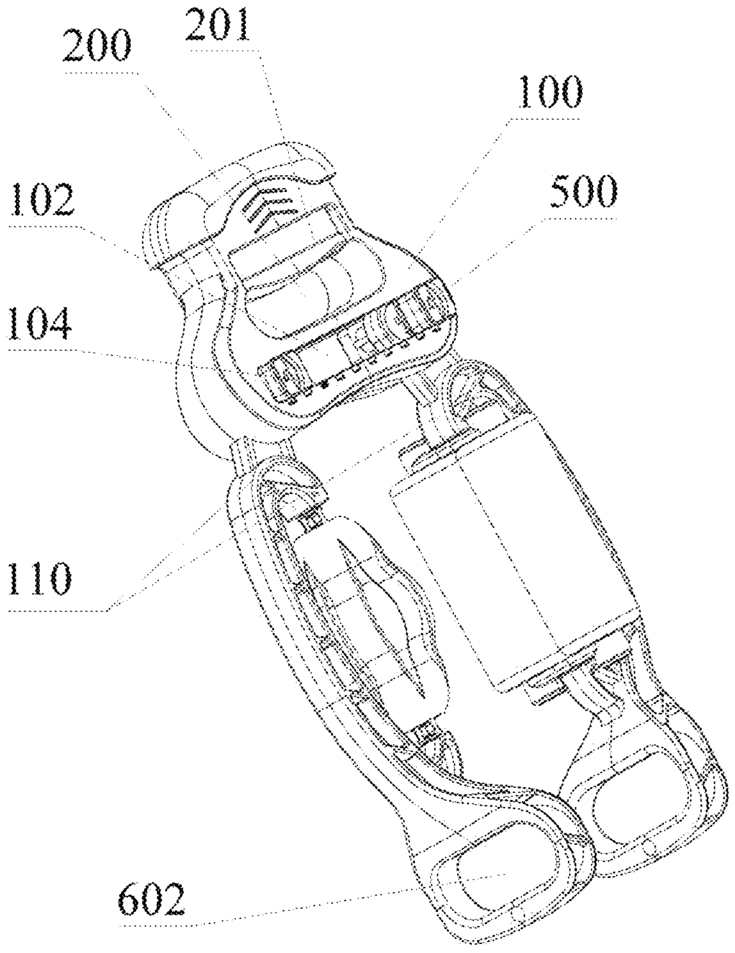
FIG. 1 is a schematic diagram of the three-dimensional structure of the present disclosure.

Grip body (100); Installation groove (102); Through groove (103); Groove (104); Massage member (110); First grip part (200); Grip strength exercise device (201); Pin shaft component (500); Muff-coupling member (501); Rotating member (502); Limit member (503); Rib (504); Locking teeth (505); Locking hole (506); Blocking block (507); Twisting teeth (508); Sliding groove (509); Connecting hole (510); Connecting post (511); Mating teeth (512); Unlocking grooves (513); Connecting member (600); Insertion hole (601); Second grip (602); First massage part (700); First rotating shaft (702); Second rotating shaft (703); First massage wheel (704); Second massage wheel (705); Second massage part (800); Third rotating shaft (802); Third massage wheel (803).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Figure 2:
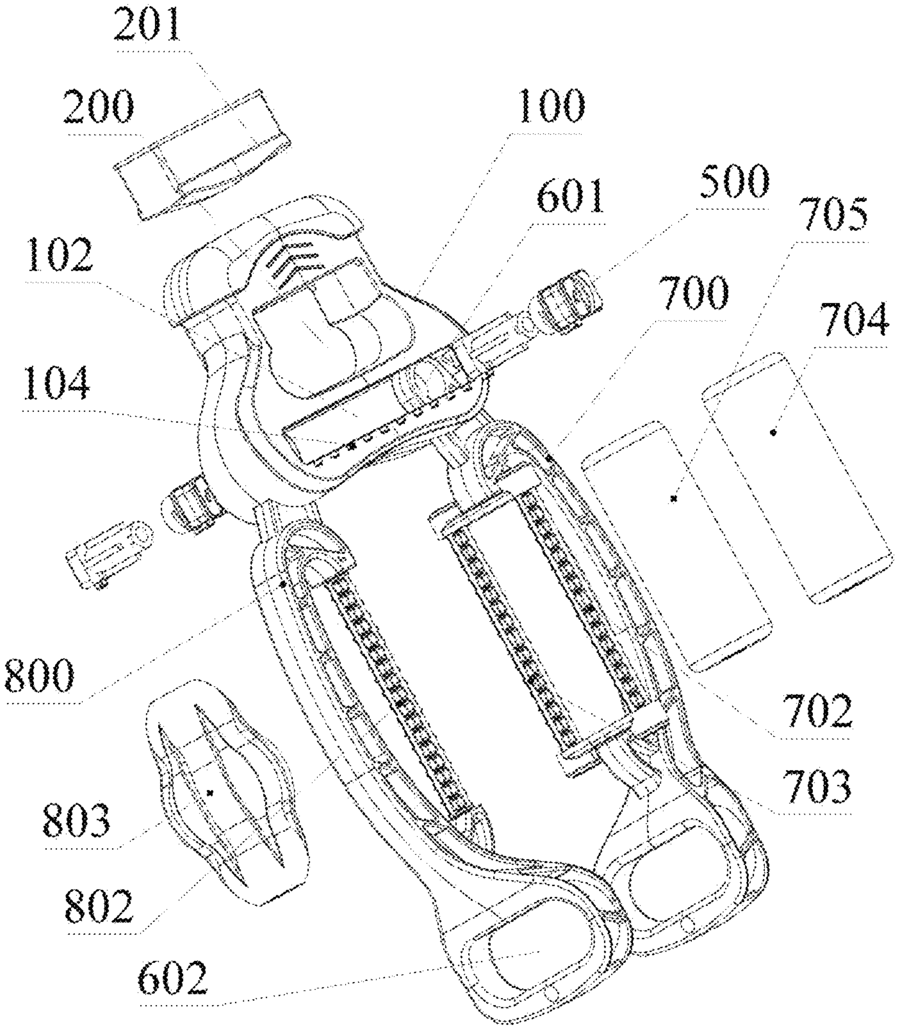
FIG. 2 is a schematic diagram of the three-dimensional explosion structure of the present disclosure.
Figure 3:
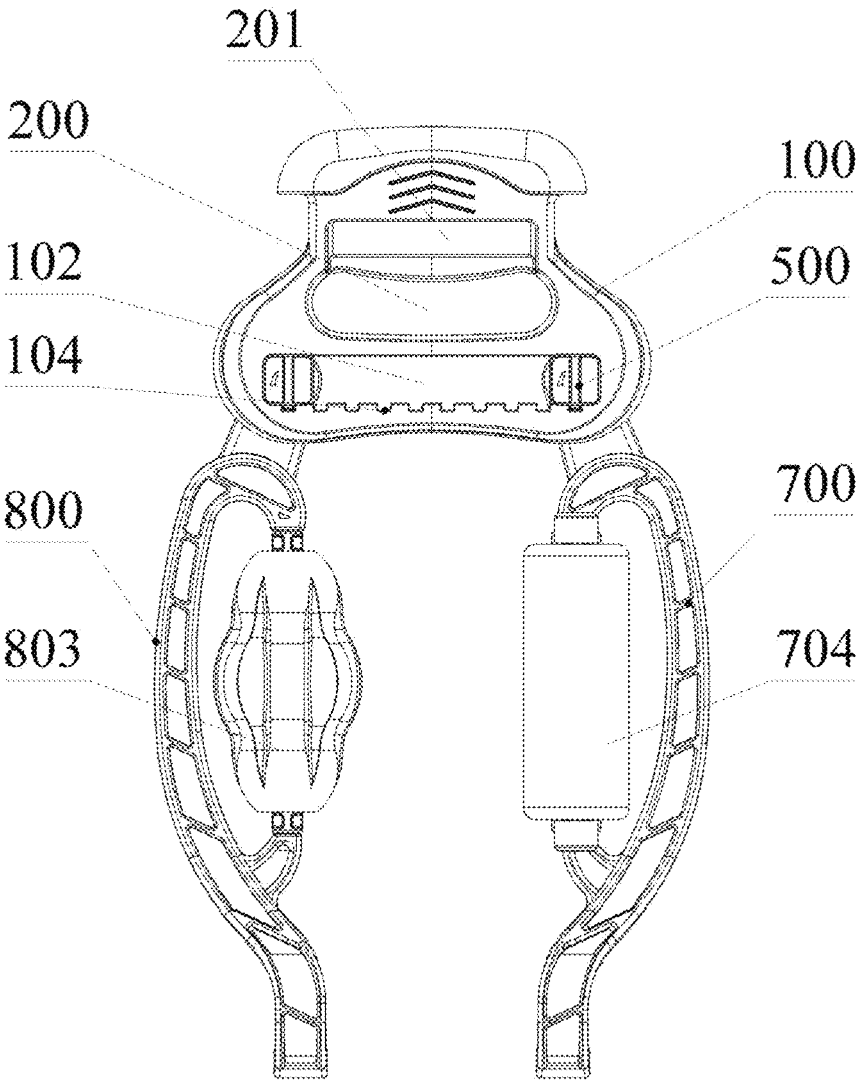
FIG. 3 is a front view of the present disclosure.
Figure 4:
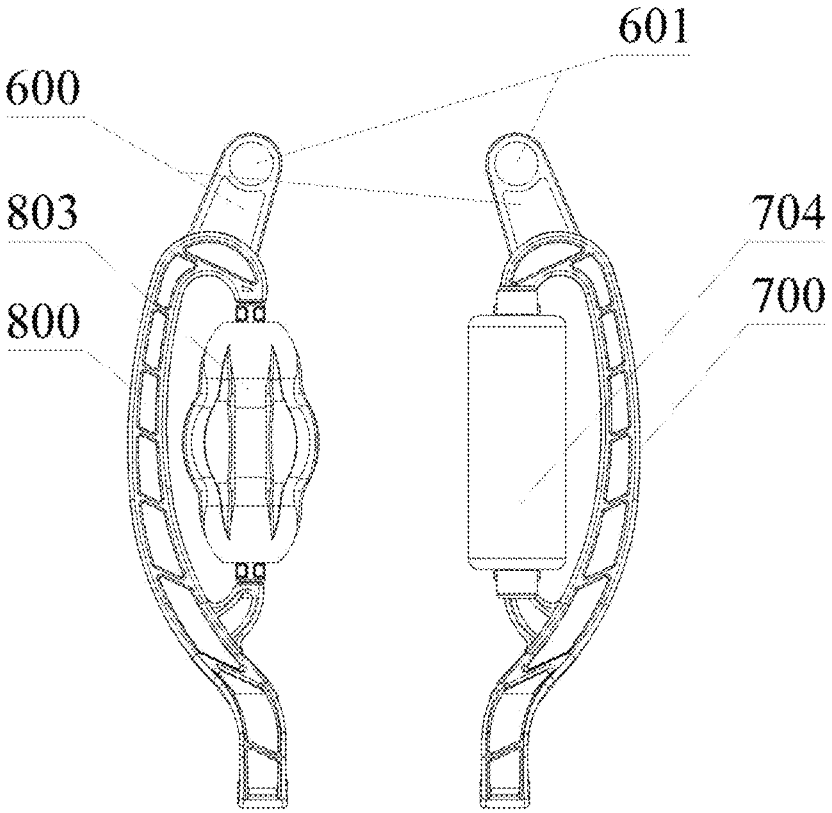
FIG. 4 is a front view of that massage member of the present disclosure.
Figure 5:
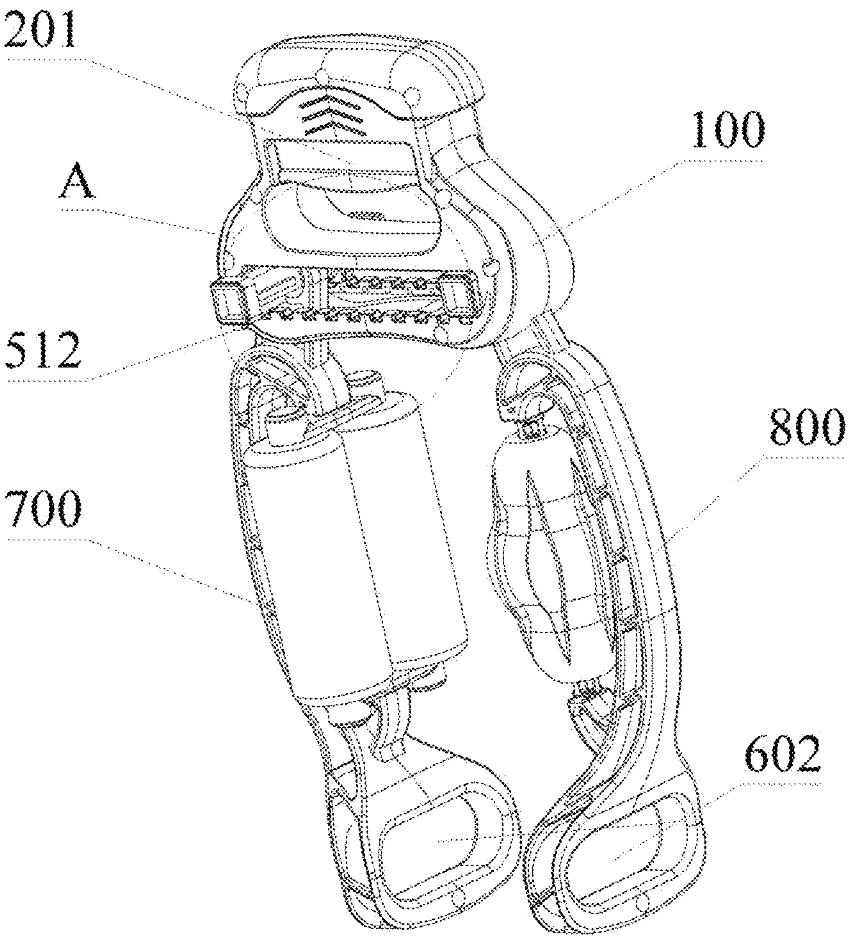
FIG. 5 is a schematic view of the three-dimensional structure from another perspective of the present disclosure.

According to a preferred embodiment of the present disclosure, as shown in FIGS. 1-2, the present disclosure provides a multifunctional muscle relaxer, which includes a grip body 100 and a massage member 110. The grip body 100 is provided with an installation groove 102 for installing the massage member 110, a pin shaft component 500 is arranged between the massage member 110 and the installation groove 102, and the massage member 110 is detachably connected with the grip body 100 through the pin shaft component 500. The pin shaft component 500 is connected with the installation groove 102 in a sliding manner and has a rotatable position and a fixed position. A first grip part 200 is arranged on the grip body 100, and a grip strength exercise device 201 is arranged in the first grip part 200.

As shown in FIG. 3-6, in this embodiment, the grip body 100 is provided with a through groove 103 communicating with the installation groove 102, which facilitates the connecting member 600 to extend into the installation groove 102. The massage member 110 includes a first massage part 700 and a second massager 800, and the connecting members 600 are arranged at the ends of the first massage part 700 and the second massager 800 near the grip body 100. The connecting member 600 passes through the through groove 103 and enters the installation groove 102, and the connecting member 600 is provided with an insertion hole 601 located in the installation groove 102, which is convenient for fixing the massage member 110 on the grip body 100.

A first rotating shaft 702 and a second rotating shaft 703 are rotatably arranged on the first massage part 700, and a first massage wheel 704 and a second massage wheel 705 are respectively fixedly arranged on the first rotating shaft 702 and the second rotating shaft 703. A third rotating shaft 802 is rotatably arranged on the second massage part 800, and a third massage wheel 803 is fixedly arranged on the third rotating shaft 802. When the relaxer is used, the three massage wheels roll on muscles to massage muscles and relax them.

In other embodiments, the first rotating shaft 702, the second rotating shaft 703 and the third rotating shaft 802 can be replaced by other types of rotating mechanisms, such as sliding rail, swinging mechanism or vibrating mechanism, as long as they can drive the massage wheel to produce effective rolling or massaging actions on muscles.

The ends of the first massage part 700 and the second massage part 800 far away from the connecting member 600 are both provided with second grip parts 602, and holding the second grip part 602 can make the muscle relaxer have more diversified use states.

The shape of the second grip part 602 can be replaced according to ergonomic design to provide a more comfortable grip. For example, it can be designed into an arc, a circle or a shape that conforms to the outline of the hand. At the same time, some suitable materials can be added to the first grip to make it softer, non-slip or have a specific touch (such as massage particles) to increase the stability and comfort of grip.

Figure 7:
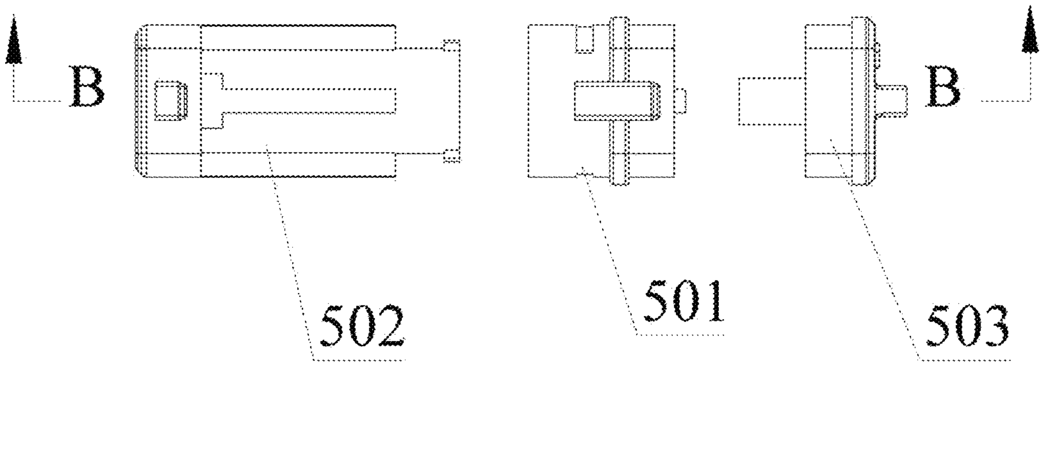
FIG. 7 is an exploded view of the front view of the pin shaft component according to the present disclosure.
Figure 8:
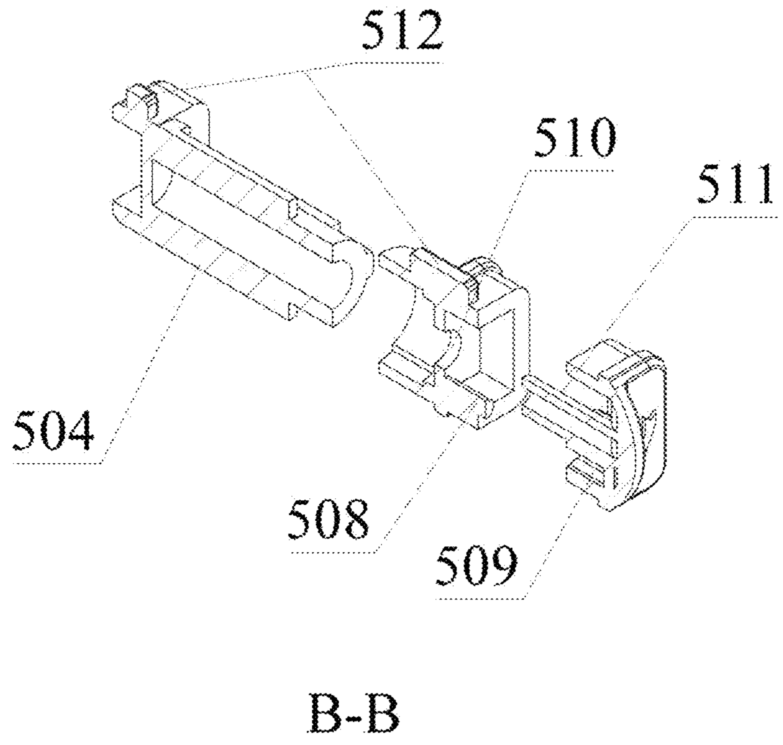
FIG. 8 is an isometric side view of the sectional view taken at B in FIG. 7.
Figure 9:
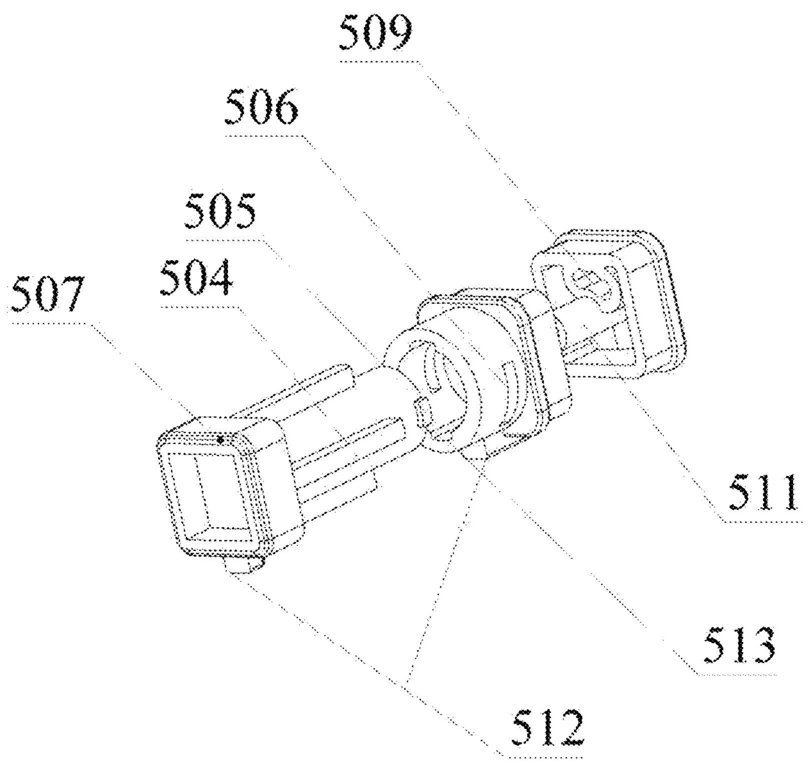
FIG. 9 is an exploded view of the pin shaft component in the present disclosure.

As shown in FIGS. 7-9, in this embodiment, in order to facilitate disassembly, the pin shaft component 500 includes a rotating member 502, a muff-coupling member 501 and a limit member 503. The rotating member 502 and the muff-coupling member 501 are respectively arranged at notches on both sides of the installation groove 102, the rotating member 502 passes through the insertion hole 601 and is detachably connected with the muff-coupling member 501. The limit member 503 is detachably installed at the other end of the muff-coupling member 501, and the pin shaft component 500 fixes the massage member 110 on the grip body 100 through the insertion hole 601.

The rotating member 502 is provided with a plurality of ribs 504, which reduces the contact area between the rotating member 502 and the insertion hole 601, thereby reducing the friction between them, and facilitating the removal of the rotating member 502. One end of the rotating member 502 is fixedly provided with a blocking block 507 for blocking the pin shaft component 500 from sliding back and forth, and the other end is fixedly provided with a plurality of locking teeth 505.

In other embodiments, the number, shape and distribution of the ribs 504 can be adjusted according to actual needs to achieve the best friction reduction effect.

The circumferential surface of the muff-coupling member 501 is provided with locking holes 506 corresponding to the locking teeth 505 one by one. When the locking teeth 505 are locked in the locking holes 506, the muff-coupling member 501 is locked with the rotating member. The cylindrical surface of the muff-coupling member 501 is provided with unlocking grooves 513 corresponding to the locking teeth 505 one by one. When the locking teeth 505 rotate to correspond to the unlocking grooves 513, the muff-coupling member 501 can be provided with a twisting teeth 508 at one end far from the cylindrical surface, and a muff-coupling member 501 is formed in the middle of the muff-coupling member 501.

In other embodiments, the number, shape and distribution of locking holes 506 can be adjusted according to the number and shape of locking teeth 505 on the rotating member 502 to ensure the reliability and stability of locking.

One end of the limit member 503 close to the muff-coupling member 501 is provided with a connecting post 511 which can be inserted and matched with the connecting hole 510. When the connecting post 511 is inserted into the connecting hole 510, the limit member 503 is inserted and matched with the muff-coupling member 501. One end of the muff-coupling member 501 is provided with a sliding groove 509 which can accommodate the twisting teeth 508.

The bottoms of notches on both sides of the installation groove 102 are provided with a plurality of grooves 104, and the outer surfaces of the rotating member 502 and the muff-coupling member 501 are provided with mating teeth 512. The mating teeth 512 of the rotating member 502 and the muff-coupling member 501 are inserted into the grooves 104 on the same side and slidably connected with the grooves 104.

Figure 6:
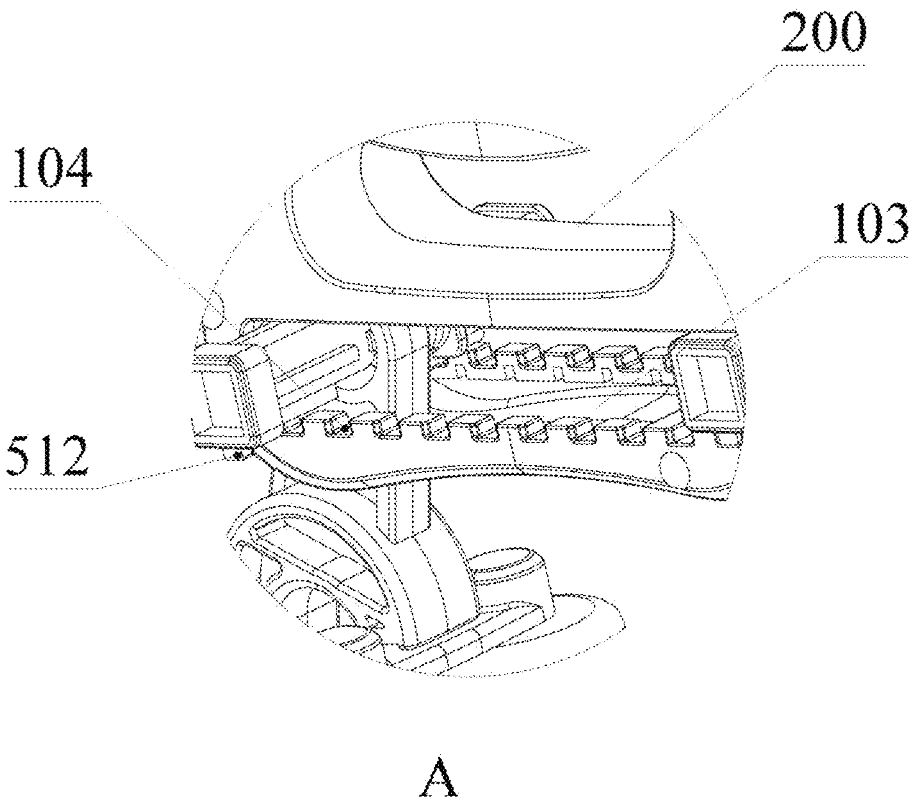
FIG. 6 is an enlarged view at A in FIG. 5.

As shown in FIG. 6, when the pin shaft component 500 is in a rotatable position, the mating teeth 512 of the rotating member 502 slide out of the grooves 104, and the rotating member 502 and the muff-coupling member 501 can rotate relatively, so that the locking teeth 505 on the rotating member 502 rotate to a position suitable for the unlocking grooves 513 on the muff-coupling member 501, so that the rotating member 502 can be pulled out and disassembled. When the rotating member 502 slides out of the insertion hole 601, the connecting member 600 can slide in the installation groove 102, so as to adjust the distance between the first massage part 700 and the second massage part 800. The muff-coupling member 501 and the limit member 503 are provided with protrusions on both sides in the grooves 104, which can keep the muff-coupling member 501 and the limit member 503 fixed in the installation groove 102 and can slide in the installation groove 102.

When the pin shaft component 500 is in a fixed position, the mating teeth 512 of the rotating member 502 are inserted into the grooves 104, and at the same time, the rotating member 502 passes through the insertion hole 601 and is inserted into the muff-coupling member 501. The limit member 503 is twisted to drive the muff-coupling member 502 to rotate, and the locking teeth 505 on the rotating member 502 are locked into the locking holes 506 on the muff-coupling member 501, so that the rotating member 502 and the muff-coupling member 502 are locked into a whole, thereby limiting the movement of the connecting member 600.

The number, shape and distribution of the mating teeth 512 can be adjusted according to the design of the grooves 104, so as to ensure a close fit and smooth sliding with the grooves 104.

In other embodiments, besides the interaction between the grooves 104 and the mating teeth 512, other types of locking mechanisms can be considered, such as thread locking, spring locking, magnetic locking and the like, all of which can realize the functions of rotating and fixing the position of the pin shaft component 500.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A multifunctional muscle relaxer, comprising a grip body and a massage member; wherein the grip body is provided with an installation groove for installing the massage member, a pin shaft component is arranged between the massage member and the installation groove, and the massage member is detachably connected with the grip body through the pin shaft component; and the pin shaft component is connected with the installation groove in a sliding manner and has a rotatable position and a fixed position; and a first grip part is arranged on the grip body, and a grip strength exercise device is arranged in the first grip part;

wherein an end of the massage member is provided with a connecting member, the connecting member is provided with an insertion hole located in the installation groove; the pin shaft component comprises a rotating member, a limit member and a muff-coupling member, which are respectively arranged at notches at two sides of the installation groove; the rotating member passes through the insertion hole and is detachably connected with the muff-coupling member; and the limit member is detachably installed at an end of the muff-coupling member.

2. The multifunctional muscle relaxer according to claim 1, wherein the grip body is provided with a through groove communicating with the installation groove, and the massage member comprises a first massager and a second massager.

3. The multifunctional muscle relaxer according to claim 2, wherein the ends of the first massager and the second massager close to a massager main body are both provided with connecting members, wherein the connecting member is one of said connecting members.

4. The multifunctional muscle relaxer according to claim 2, wherein the connecting members pass through the through groove and enters the installation groove.

5. The multifunctional muscle relaxer according to claim 4, wherein the rotating member is provided with a plurality of ribs, one end of the rotating member is fixedly provided with a blocking block, and another end is fixedly provided with a plurality of locking teeth.

6. The multifunctional muscle relaxer according to claim 5, wherein a circumferential surface of the muff-coupling member is provided with locking holes corresponding to the locking teeth one by one; a cylindrical surface of the muff-coupling member is provided with unlocking grooves corresponding to the locking teeth one by one; the end of the muff-coupling member far from the cylindrical surface is provided with twisting teeth, and the middle of the muff-coupling member is provided with a connecting hole.

7. The multifunctional muscle relaxer according to claim 6, wherein one end of the limit member near the muff-coupling member is provided with a connecting post which can be inserted and matched with the connecting hole; and the one end of the limit member is provided with a sliding groove which can accommodate the twisting teeth.

8. The multifunctional muscle relaxer according to claim 7, wherein bottoms of the notches on the two sides of the installation groove are provided with a plurality of grooves, and outer surfaces of the rotating member and the muff-coupling member are provided with mating teeth, and the mating teeth are inserted into the plurality of grooves on one of the sides of the installation groove and are connected with the plurality of grooves in a sliding manner.

9. The multifunctional muscle relaxer according to claim 8, wherein when the pin shaft component is in the rotatable position, the mating teeth of the rotating member slide out of the plurality of grooves;

when the pin shaft component is in the fixed position, the mating teeth of the rotating member are inserted into the plurality of grooves.

10. A multifunctional muscle relaxer, comprising a grip body, a first massage part and a second massage part, wherein the grip body is provided with an installation groove for installing a massage member, a pin shaft component is arranged between the massage member and the installation groove; the first massage part and the second massage part are both detachably connected with the grip body through the pin shaft component;

the pin shaft component is connected with the installation groove in a sliding manner and has a rotatable position and a fixed position;

the grip body is provided with a first grip part, and a grip strength exercise device is arranged in the first grip part;

the grip body is provided with a through groove communicating with the installation groove, each of the first massage part and the second massage part comprises an end relatively close to the grip body and an end relatively far from the grip body, and the end of the first massage part relatively close to the grip body and the end of the second massage part relatively close to the grip body are each provided with respective connecting members; and wherein the connecting members pass through the through groove and enter the installation groove, and each of the respective connecting members is provided with a respective insertion hole located in the installation groove.

11. The multifunctional muscle relaxer according to claim 10, wherein a first rotating shaft and a second rotating shaft are rotatably arranged on the first massage part, and a first massage wheel and a second massage wheel are fixedly arranged on the first rotating shaft and the second rotating shaft respectively.

12. The multifunctional muscle relaxer according to claim 10, wherein a third rotating shaft is rotatably arranged on the second massage part, and a third massage wheel is fixedly arranged on the third rotating shaft.

13. The multifunctional muscle relaxer according to claim 10, wherein the end of the first massage part relatively far from the grip body and the end of the second massage part relatively far from the grip body are each provided with a respective second grip part.

14. A multifunctional muscle relaxer, comprising a grip body and a massage member, wherein the grip body is provided with an installation groove for installing a massage member, a pin shaft component is arranged between the massage member and the installation groove, and the massage member is detachably connected with the grip body through the pin shaft component; and the pin shaft component is connected with the installation groove in a sliding manner and has a rotatable position and a fixed position;

the pin shaft component comprises a rotating member, a muff-coupling member and a limit member; the rotating member and the muff-coupling member are respectively arranged at notches at two sides of the installation groove; and a limit structure is arranged between the rotating member and the muff-coupling member.

15. The multifunctional muscle relaxer according to claim 14, wherein the limit structure is a plurality of grooves opened at bottoms of the notches at both sides of the installation groove.

16. The multifunctional muscle relaxer according to claim 15, wherein outer surfaces of the rotating member and the muff-coupling member are both provided with mating teeth, and the mating teeth are inserted into the plurality of grooves on one of the sides of the installation groove and connected with the plurality of grooves in a sliding manner.

17. The multifunctional muscle relaxer according to claim 16, wherein when the pin shaft component is in the rotatable position, the mating teeth of the rotating member slide out of the plurality of grooves; when the rotating member is in the fixed position, and the mating teeth of the rotating member are inserted into the plurality of grooves.

* * * * *